D. ABREY.
Device for Transmitting Power.
No. 220,560.  Patented Oct. 14, 1879.
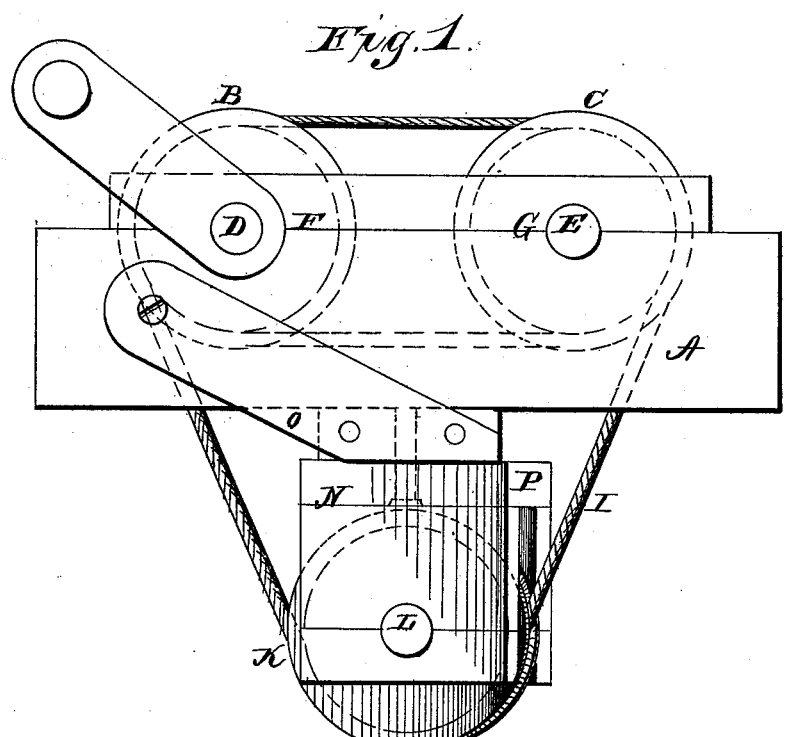
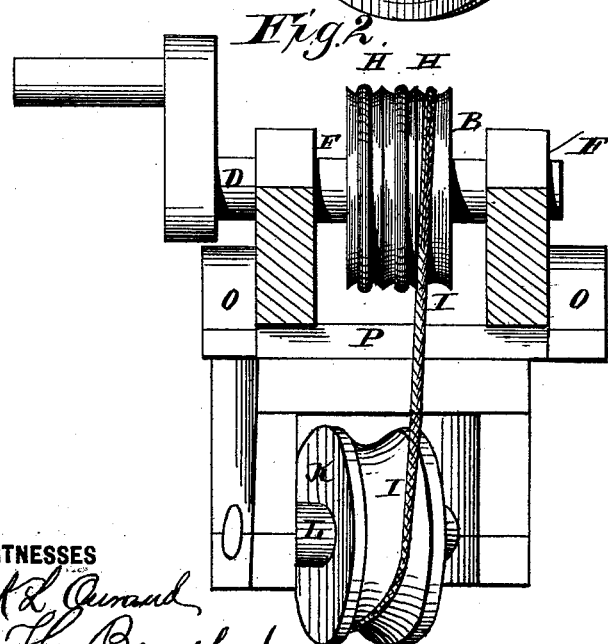

UNITED STATES PATENT OFFICE.

DANIEL ABREY, OF GREENVILLE, MICHIGAN.

IMPROVEMENT IN DEVICES FOR TRANSMITTING POWER.

Specification forming part of Letters Patent No. 220,560, dated October 14, 1879; application filed August 8, 1879.

*To all whom it may concern:*

Be it known that I, DANIEL ABREY, of Greenville, in the county of Montcalm and State of Michigan, have invented certain new and useful Improvements in Devices for Transmitting Power; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in mechanism for transmitting power from one pulley, forming a prime motor, to another by means of a rope, chain, or band passing around said pulley two or more times in suitable grooves formed in the periphery of each pulley, whereby an increased amount of friction on the peripheries of the pulleys with a smaller rope can be secured than has heretofore been accomplished, and also in certain mechanism to be used in connection with said pulleys and the endless rope, band, or chain, consisting of a loose pulley adjustably mounted, which serves as a tightener to take up the slack of the rope, band, or chain and automatically maintain the same at proper tension, and also to prevent the parts of said rope, band, or chain from rubbing together, and the consequent wear of the same, as more fully hereinafter specified.

In the drawings, Figure 1 represents a side elevation of my invention, and Fig. 2 a transverse vertical section thereof.

The letter A indicates a rectangular or other shaped frame, constructed of suitable material, in which the driving and driven pulleys B and C, mounted upon suitable shafts D and E, are supported, the said shafts D and E being journaled in suitable bearings F and G in the said frame A.

The frame A may be of any desired length, and the pulleys mounted therein at any convenient distance apart. The said pulleys are preferably formed with a series of two or more grooves, H, on their peripheries for the reception of the rope, band, or chain I, which is passed around them two or more times and connected at the ends, so as to be continuous.

In order that the said rope, band, or chain may pass freely from one pulley to the other the said pulleys are set obliquely or askew on their shafts, being located in opposite oblique planes, so that the rope, chain, or band passing from the groove in one pulley will enter naturally into the succeeding groove of the other pulley.

The letter K indicates a pulley having a groove in its periphery, and mounted upon a shaft, L, journaled in bearings M in a hanger, N, secured to the lower ends of the arms O, pivoted at their upper ends to the opposite sides of the frame A. The said hanger is preferably swiveled to a cross-bar, P, connecting the two ends of the arms O, by means of which it may automatically adapt itself to the obliquity of the rope, band, or chain as it passes around said pulley K from the pulleys B and C, the obliquity of said rope, band, or chain varying according to the number of turns it takes around the pulleys B and C and the distance apart at which they are mounted in the frame A.

The pulley K, being adjustably mounted with respect to the frame A, in which the pulleys B and C are mounted, serves by its own weight and the weight of the hanger in which it is journaled to keep a proper tension upon the rope, band, or chain, and also to keep the parts of said rope, band, or chain from rubbing against each other, and the consequent wear upon the same, as the swiveled connection of the hanger permits said pulley K to adjust itself automatically, so as to allow the parts to fall freely into their respective grooves out of contact with each other.

Although it is preferable to form the respective pulleys with grooves in their peripheries for the reception of the rope, band, or chain and to guide the same, it is evident that plain pulleys may be employed, which, when set obliquely, as above set forth, will permit said rope, band, or chain to pass properly around said pulleys in the manner described.

The driving-shaft of the driving-pulley *a* may be provided with a suitable crank or other device, by means of which motion may be imparted to it, and through the medium of the rope, band, or chain transmitted to the driven pulley.

Although the tightener-pulley K is preferably hung so as to automatically adjust itself to receive the rope, band, or chain easily, it is evident that said pulley may be rigidly placed in proper shape to receive said rope. It is also evident that where said driving and driven pulleys are placed at a considerable distance apart two or more tightener-pulleys, K, may be used to carry the rope or band smoothly without jerking.

Having thus described my invention, what I claim, and desire to secure by Letters Patent, is—

The combination, with the pulleys B and C, provided with two or more grooves, H, of the endless belt, band, or chain I and the independent adjustable swivel-pulley K, adapted to take up the slack of the band I, substantially as and for the purpose set forth.

In testimony that I claim the foregoing I have hereunto set my hand this 5th day of August, 1879.

DANIEL ABREY.

Witnesses:
DAVID A. ELIOT,
ELLIOT D. BRADLEY.